United States Patent
Marupaduga et al.

(10) Patent No.: US 9,357,546 B1
(45) Date of Patent: May 31, 2016

(54) METHODS AND SYSTEMS FOR CONTROLLING TTI BUNDLING

(71) Applicant: Sprint Spectrum L.P., Overland Park, KS (US)

(72) Inventors: Sreekar Marupaduga, Overland Park, KS (US); Rajveen Narendran, Olathe, KS (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 283 days.

(21) Appl. No.: 13/946,233

(22) Filed: Jul. 19, 2013

(51) Int. Cl.
*H04W 72/04* (2009.01)
*H04W 72/12* (2009.01)

(52) U.S. Cl.
CPC ...... *H04W 72/0446* (2013.01); *H04W 72/1278* (2013.01); *H04W 72/1284* (2013.01)

(58) Field of Classification Search
None
See application file for complete search history.

(56) References Cited

U.S. PATENT DOCUMENTS

| 7,764,965 | B2 | 7/2010 | Bartlett | |
|---|---|---|---|---|
| 8,982,755 | B1 * | 3/2015 | Shah | H04L 1/18 370/311 |
| 2009/0257408 | A1 * | 10/2009 | Zhang et al. | 370/336 |
| 2009/0268707 | A1 * | 10/2009 | Pani et al. | 370/345 |
| 2009/0307554 | A1 | 12/2009 | Marinier et al. | |
| 2010/0042884 | A1 | 2/2010 | Kuo et al. | |
| 2010/0067412 | A1 | 3/2010 | Kitazoe et al. | |
| 2010/0329188 | A1 | 12/2010 | Jen | |
| 2011/0038352 | A1 | 2/2011 | Bergman et al. | |
| 2011/0078530 | A1 | 3/2011 | Shiizaki et al. | |
| 2012/0084343 | A1 * | 4/2012 | Mir et al. | 709/203 |
| 2012/0147830 | A1 | 6/2012 | Löhr et al. | |
| 2014/0056243 | A1 * | 2/2014 | Pelletier et al. | 370/329 |
| 2014/0056289 | A1 * | 2/2014 | Englund et al. | 370/336 |
| 2014/0321418 | A1 * | 10/2014 | Rinne et al. | 370/329 |

FOREIGN PATENT DOCUMENTS

EP      2 184 882 A2    5/2010

OTHER PUBLICATIONS

Susitaival et al., "LTE coverage improvement by TTI bundling," Proceedings of 69th Vehicular Technology Conference, IEEE, Barcelona, Spain, 2009.
"Methods and Systems for Selecting a TTI Bundle Size," U.S. Appl. No. 13/659,606, filed Oct. 24, 2012.

* cited by examiner

*Primary Examiner* — Gregory Sefcheck
*Assistant Examiner* — Srinivasa Reddivalam

(57) ABSTRACT

A radio access network (RAN) determines whether transmission time interval (TTI) bundling is warranted for a wireless communication device (WCD) based on information contained in one or more reports from the WCD. The information may include a reference-signal value, such as a reference signal received power (RSRP) or a reference signal received quality (RSRQ), in a measurement report, an amount of data indicated in a buffer status report as being buffered by the WCD for transmission via one or more bearers in a bearer group, and a service class associated with the bearer group. If the RAN determines that TTI bundling is warranted for the WCD, the RAN may further select a TTI bundle size for the WCD. The RAN may select the TTI bundle size from among a plurality of values, which values may include a standard TTI bundle size and a smaller TTI bundle size.

14 Claims, 8 Drawing Sheets

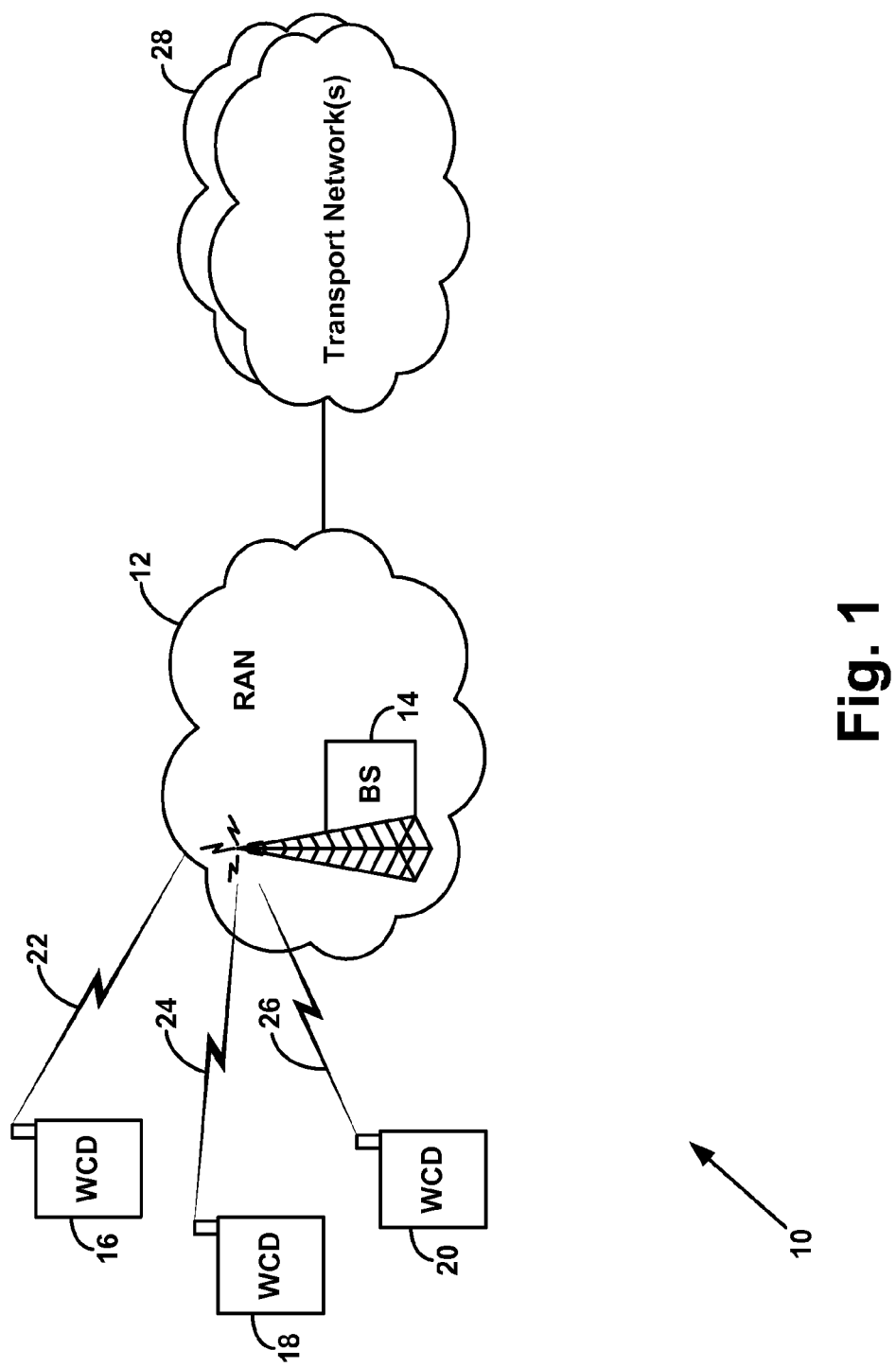

METHODS AND SYSTEMS FOR CONTROLLING TTI BUNDLING

BACKGROUND

In some wireless communication systems, when data that is transmitted by a transmitting entity to a receiving entity is not received by the receiving entity, or is received by the receiving entity with one or more errors, the data may be re-transmitted by the transmitting entity. The re-transmission of data could occur either automatically or in response to feedback from the receiving entity. For example, in Long Term Evolution (LTE) air interfaces, a Hybrid Automatic Repeat Request (HARQ) procedure is used. In the HARQ approach, after a transmitting entity has transmitted a block of data, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data. The transmitting entity may also re-transmit the data if the transmitting entity does not receive any HARQ response within a certain period of time.

This re-transmission approach can allow data to be successfully transmitted from a transmitting entity to a receiving entity even when there is a substantial probability that the transmitted data will be received with one or more errors, for example, because of poor radio frequency (RF) conditions. Specifically, the data can be re-transmitted multiple times until the data is received without errors. This re-transmission approach, however, also increases latency. For example, there can be a period of delay between when the transmitting entity transmits data and when the transmitting data receives a NACK response from the receiving entity, and there can be another period of delay between when the transmitting entity receives the NACK response and when the transmitting entity begins re-transmitting the data.

In order to reduce the delay associated with re-transmitting data, LTE supports a bundling option for data transmissions by the user equipment (UE) in the Physical Uplink Shared Channel (PUSCH). Normally, the UE transmits data in one transmission time interval (TTI), which corresponds to a 1 millisecond (ms) subframe, and then waits to receive a HARQ response before re-transmitting the data or transmitting additional data. However, when TTI bundling is used, the UE transmits the same data four times in four consecutive TTIs and then waits to receive a HARQ response. In this way, the UE can transmit four instances of the same data, which allows for more robust reception of the data, but without the delay that would be associated with the UE transmitting the data four times and waiting for a HARQ response after each transmission.

OVERVIEW

In a first principal aspect, an exemplary embodiment provides a method that involves a radio access network (RAN) and a wireless communication device (WCD). The RAN receives a measurement report from the WCD. The measurement report includes a reference-signal value determined by a process comprising the WCD coherently demodulating reference signals transmitted by the RAN. The RAN receives a buffer status report from the WCD. The buffer status report includes a buffered-data value indicative of an amount of data being buffered by the WCD for transmission via one or more bearers in a bearer group. The bearer group is associated with one or more service classes. The RAN determines that transmission time interval (TTI) bundling is warranted for the WCD based on at least the measurement report and buffer status report. The RAN transmits an instruction to the WCD to use TTI bundling.

In a second principal aspect, an exemplary embodiment provides a method that involves a radio access network (RAN) and a wireless communication device (WCD). The RAN receives a measurement report from the WCD. The measurement report includes a reference-signal value determined by a process comprising the WCD coherently demodulating reference signals transmitted by the RAN. The RAN receives a buffer status report from the WCD. The buffer status report includes a buffered-data value indicative of an amount of data being buffered by the WCD for transmission via one or more bearers in a bearer group. The RAN receives a power headroom report from the WCD. The power headroom report includes a battery-life value indicative of a remaining battery life of a battery in the WCD. The RAN selects a transmission time interval (TTI) bundle size for the WCD based on at least the measurement report, buffer status report, power headroom report, and battery report.

In a third principal aspect, an exemplary embodiment provides a system. The system comprises: a transmitter for transmitting orthogonal frequency division multiplexing (OFDM) signals in a plurality of downlink channels, the plurality of downlink channels including a downlink shared channel and a downlink control channel; a receiver for receiving OFDM signals in a plurality of uplink channels, the plurality of uplink channels including an uplink shared channel; and a controller. The controller is configured to determine whether transmission time interval (TTI) bundling is warranted for a wireless communication device (WCD) based on at least a measurement report and buffer status report transmitted by the WCD. The measurement report includes a reference-signal value determined by a process comprising the WCD coherently demodulating reference signals transmitted by the transmitter. The buffer status report includes a buffered-data value indicative of an amount of data being buffered by the WCD for transmission via one or more bearers in a bearer group. The bearer group is associated with one or more service classes. The controller is further configured to, in response to a determination that TTI bundling is warranted for the WCD, cause the transmitter to transmit an instruction to the WCD in the downlink control channel. The instruction instructs the WCD to use TTI bundling when transmitting data in the uplink shared channel.

BRIEF DESCRIPTION OF THE DRAWINGS

FIG. 1 is a block diagram of a communication system, in accordance with an example embodiment.

DETAILED DESCRIPTION OF EXAMPLE EMBODIMENTS

1. Introduction

Figure 2A:
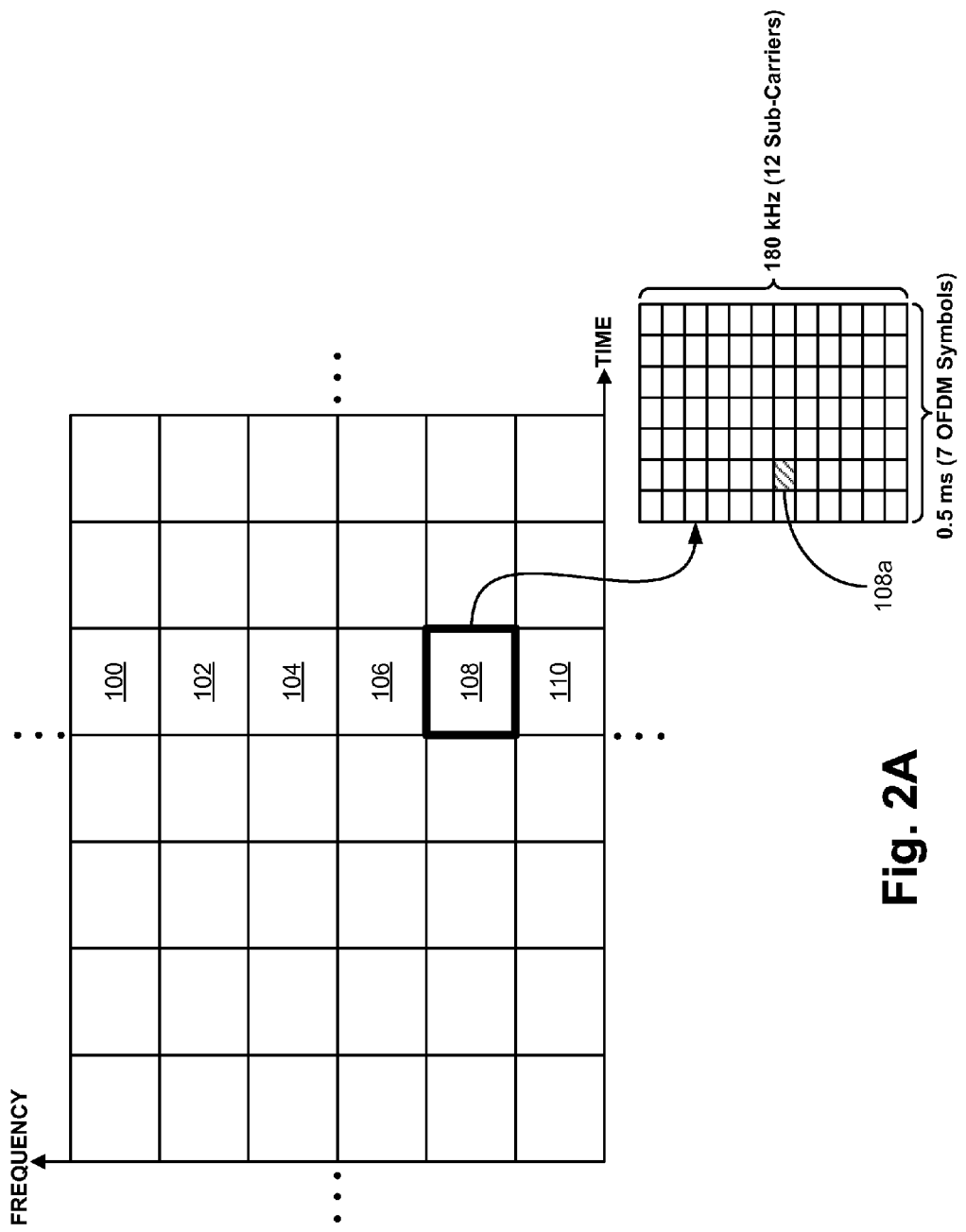
FIG. 2A is a conceptual illustration of a division of uplink resources into resource blocks, in accordance with an example embodiment.

Disclosed herein are methods and systems for controlling TTI bundling. In one aspect, controlling TTI bundling can involve determining whether TTI bundling is warranted for a particular WCD. In another aspect, controlling TTI bundling can involve selecting a TTI bundle size for a particular WCD when TTI bundling is warranted for that WCD.

To determine whether TTI bundling is warranted for a WCD, a RAN may receive one or more reports from the WCD and determine whether TTI bundling is warranted for the WCD based, at least in part, on information contained in the one or more reports. In one example, the RAN receives a measurement report and a buffer status report from a WCD. The measurement report may include a reference-signal value relating to reference signals transmitted by the RAN and received by the WCD. The reference-signal value could be, for example, indicative of a reference signal received power (RSRP) or a reference signal received quality (RSRQ). The buffer status report may include a buffered-data value indicative of an amount of data being buffered for transmission via one or more bearers in a bearer group, and the bearer group may be associated with one or more service classes. The RAN may determine that TTI bundling is warranted for the WCD if all of the following conditions are met: (1) the reference-signal value is in a range of reference-signal values for which TTI bundling is supported (e.g., a range of values indicative of the WCD being in an area with poor or marginal RF coverage); (2) the bearer group is associated with a service class for which TTI bundling is supported (e.g., a service class used for latency-sensitive services, such as conversational voice or video); and (3) the buffered-data value is in a range of buffered-data values for which TTI bundling is supported (e.g., a sufficiently low amount of buffered data). If the conditions are not met, then the RAN may determine that TTI bundling is not warranted for the WCD.

Once the RAN has determined that TTI bundling is warranted for a WCD, the RAN may instruct the WCD to use TTI bundling. The instruction may be part of an uplink resource allocation that the RAN transmits to the WCD, for example, in a Physical Downlink Control Channel (PDCCH). In some embodiments, the WCD may then use a standard TTI bundle size, such as a TTI bundle size of N=4.

In other embodiments, the RAN may select a TTI bundle size for the WCD from among a plurality of values. For example, the plurality of values may include a standard TTI bundle size (e.g., N=4) and a smaller TTI bundle size (e.g., N=2). The RAN may select the standard TTI bundle size, unless a measurement report, buffer status report, or power headroom report from the WCD indicates that the smaller TTI bundle size would be sufficient or beneficial. For example, if the reference-signal value in the measurement report is sufficiently high, the buffered-data value is sufficiently high, or the power headroom report indicates that the WCD has sufficient power headroom, then the RAN may select the smaller TTI bundle size. Otherwise, the RAN may select the standard TTI bundle size. The RAN may also take into account a remaining battery life of a battery in the WCD, which the WCD may indicate by transmitting a battery report to the RAN. For example, if the WCD's remaining battery life is sufficiently low, then the RAN may select the smaller TTI bundle size.

2. Example Communication System

FIG. 1 is a block diagram of a communication system 10 in which exemplary embodiments may be employed. Communication system 10 includes a radio access network (RAN) 12 that includes one or more entities that can communicate over an air interface, as exemplified by base station (BS) 14. RAN 12 could also include one or more control entities, such as a base station controller (BSC) or radio network controller (RNC). BS 14 could be, for example, a base transceiver station, a wireless access point, an access node, a Node-B, or an eNodeB. Although FIG. 1 shows only one base station in RAN 12, it is to be understood that RAN 12 could include any number of base stations.

BS 14 radiates to define one or more wireless coverage areas within which BS 14 can wirelessly communicate with WCDs. The wireless coverage area defined by BS 14 could be a cell that generally surrounds BS 14. Alternatively, BS 14 may define multiple wireless coverage areas, such as sectors. Each sector may be defined by multiple antennas in BS 14 so as to generally correspond to a range of azimuthal angles (e.g., 120°) about BS 14.

For purposes of illustration, BS 14 is shown as being in wireless communication with WCDs 16, 18, and 20 via respective air interfaces 22, 24, and 26. WCDs 16, 18, and 20 could be wireless telephones, wireless handheld, tablet, or laptop computers, or other types of wireless communication devices. In some cases, a WCD could be referred to as a UE. Although FIG. 1 shows BS 14 in wireless communication with three WCDs, it is to be understood that BS 14 could be in wireless communication with a greater or fewer number of WCDs. In addition, the number of WCDs in wireless communication with BS 14 can change over time, for example, as a result of one or more WCDs moving into or out of the wireless coverage area of BS 14 and/or as a result of one or more WCDs beginning or ending communication sessions.

Each of air interfaces 22, 24, and 26 could include a respective uplink, with which a WCD can transmit data to BS 14, and a respective downlink, with which BS 14 can transmit data to a WCD. The communications over air interfaces 22, 24, and 26 could conform to any wireless protocol now known or later developed. For purposes of illustration, the communications over air interfaces 22, 24, and 26 will be described herein with respect to the LTE protocol.

RAN 12 may provide access to one or more transport networks 28, which could include, for example, the public switched telephone network (PSTN) and/or the Internet or other packet-switched networks. With this arrangement, a WCD being served by BS 14 may engage in a communication session, via RAN 12, with an endpoint connected to one of transport networks 28. The endpoint could be, for example, another WCD, a landline telephone, an email server, Web server, media server, or gaming server. The communication session could involve voice, text, images, video, data, or other media that is transferred from the WCD to the endpoint and/or from the endpoint to the WCD.

Thus, when a WCD, such as WCD 16, 18, or 20, is involved in a communication session, the WCD may transmit data over an uplink channel to BS 14 and may receive data from BS 14 over a downlink channel. In some cases, the communication session could be one that involves a user of the WCD, such as a voice communication application or Web browsing application. In other cases, the communication session could involve a background task, such as periodically registering with RAN 12. In some implementations, WCDs 16, 18, and 20 may transmit data to BS 14 over an uplink shared channel. The usage of the uplink shared channel may be controlled by BS 14 or by some other entity in RAN 12.

For example, the LTE protocol defines a Physical Uplink Shared Channel (PUSCH) that WCDs can use to transmit data to a base station. Portions of the PUSCH may be allocated to particular WCDs by allocating resource blocks. FIG. 2A illustrates how the uplink resources in a given wireless coverage area may be divided in time and frequency domains into resource blocks. In an LTE air interface, data is transmitted on both the uplink and the downlink in the form of orthogonal frequency division multiplexing (OFDM) symbols. Each OFDM symbol is formed from a plurality of sub-carriers, typically 12 sub-carriers, each with a bandwidth of 15 kHz. Thus, a resource block corresponds to a plurality of sub-carriers that are used to form an OFDM symbol and has a duration that can accommodate a particular number of OFDM symbols (e.g., seven OFDM symbols).

In the time domain, each resource block typically occupies a 0.5 ms slot of time. By way of example, FIG. 2A shows resource blocks 100-110 for a particular slot. In the frequency domain, each of resource blocks 100-110 occupies a respective portion of frequency bandwidth, typically 180 kHz in LTE implementations. Although FIG. 2A shows six resource blocks in each slot, a wireless coverage area could have a greater number of resource blocks, as indicated by the dots above and below resource blocks 100-110.

FIG. 2A also includes a more detailed view of uplink resource block 108. This detailed view shows that the 180 kHz of frequency bandwidth corresponds to 12 sub-carriers of 15 kHz each. Further, in this example, the 0.5 ms slot of time corresponds to the duration of seven OFDM symbols. In other examples, a 0.5 ms slot could correspond to a different number of OFDM symbols. Thus, a resource block may be described as a set of resource elements, with each resource element corresponding to one modulated sub-carrier in an OFDM symbol. The detailed view of uplink resource block 108 in FIG. 2A shows the division of the resource block into multiple resource elements, such as resource element 108a.

Figure 2B:
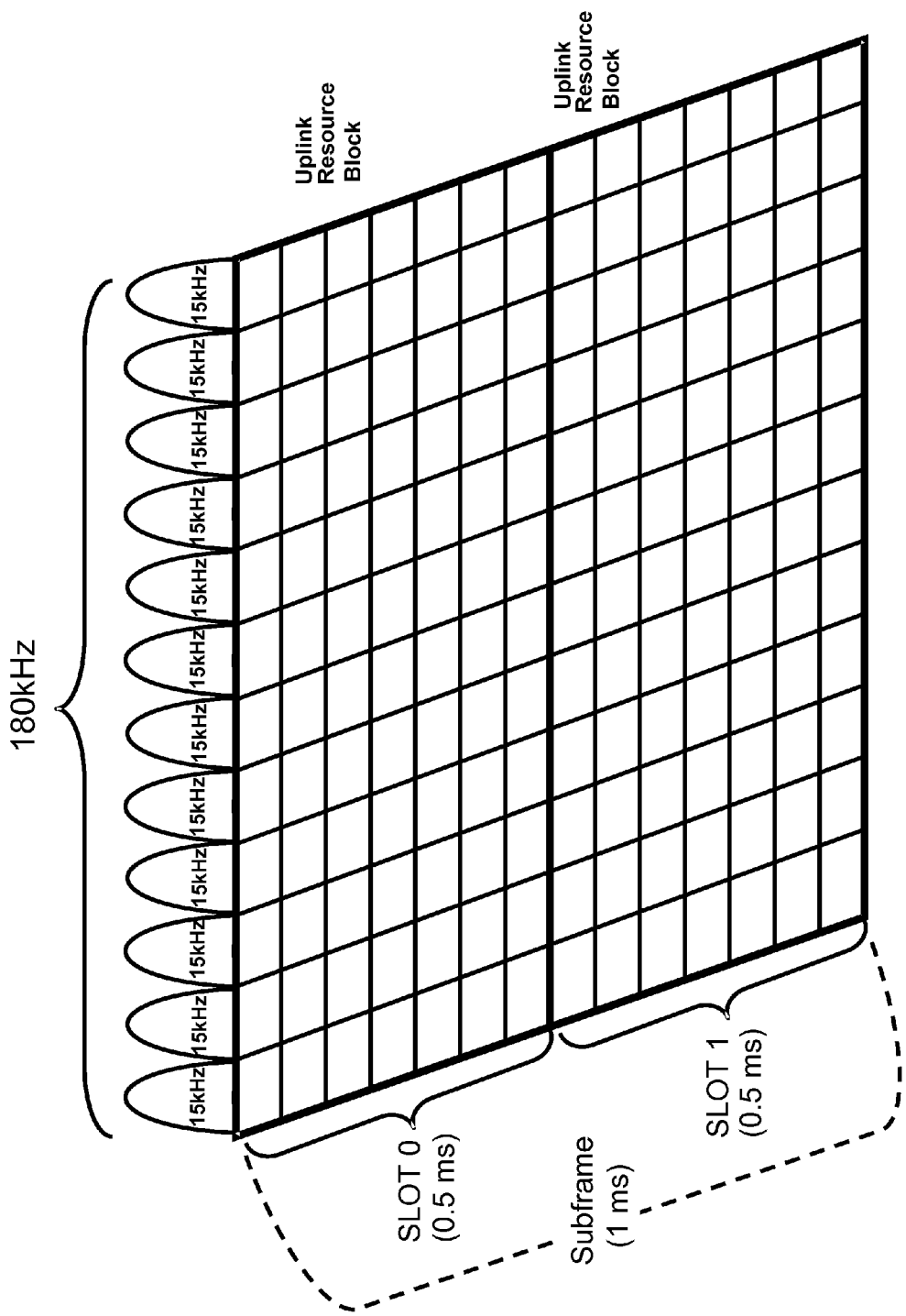
FIG. 2B is a conceptual illustration of two sequential uplink resource blocks, in accordance with an example embodiment.

A resource block may be allocated to a particular WCD to transmit data in the uplink shared channel (PUSCH channel). For example, resource blocks 100 and 102 might be allocated to WCD 16, resource blocks 104-108 might be allocated to WCD 18, and resource block 110 might be allocated to WCD 20. The allocation of resource blocks to WCDs could be made by BS 14 or by some other entity in wireless network 12. Further, resource blocks could be allocated to WCDs based on the power headrooms reported by the WCDs. BS 14 may periodically evaluate, and potentially adjust, the allocation of resource blocks to WCDs. This evaluation may occur every subframe, wherein a subframe consists of two consecutive slots (i.e., a subframe is a 1 ms period of time). Thus, when a WCD is allocated one or more resource blocks, that allocation may be maintained throughout a subframe (two consecutive slots). In subsequent subframes, the WCD may be allocated a different number of resource blocks. FIG. 2B illustrates an uplink resource allocation for a WCD that is maintained for two consecutive slots of time (Slot 0 and Slot 1) in a given subframe.

Figure 2C:
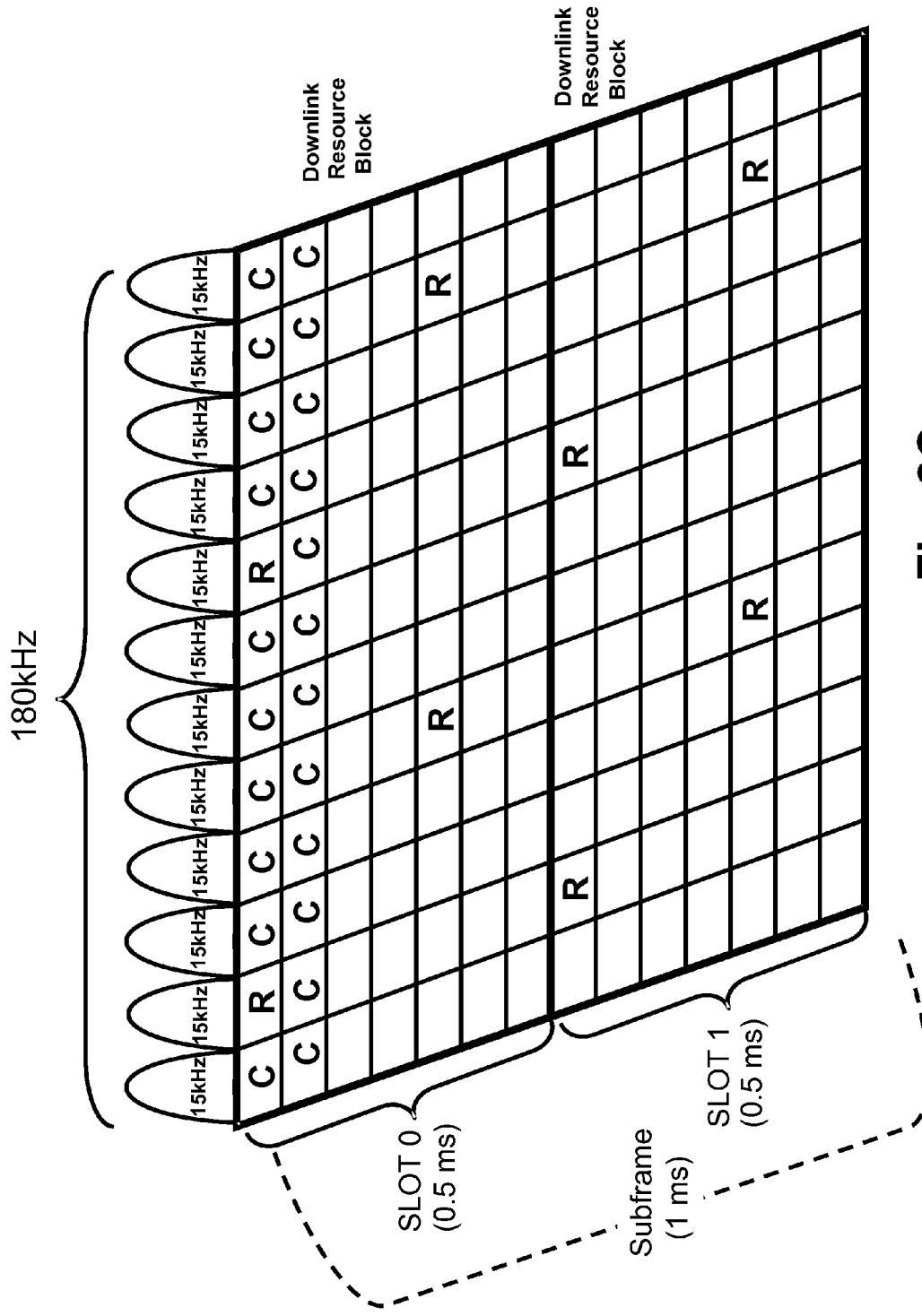
FIG. 2C is a conceptual illustration of two sequential downlink resource blocks, in accordance with an example embodiment.

Downlink resources may be similarly divided into resource blocks. FIG. 2C illustrates an example of resource elements in two successive downlink resource blocks (a Slot 0 resource block and a Slot 1 resource block) for a one antenna port system. In this example, some of the resource elements are labeled "R" to indicate that they are reserved for reference signals transmitted by the RAN (e.g., by BS 14). In addition, some of the resource elements in the first two OFDM symbols are labeled "C" to indicate that they are used to transmit control signaling, such as control signaling in the Physical Control Format Indicator Channel (PCFICH), Physical Downlink Control Channel (PDCCH), and Physical Hybrid ARQ Channel (PHICH). The other resource elements that are unlabeled can be used to transmit user data in the Physical Downlink Shared Channel (PDSCH). It is to be understood that FIG. 2C illustrates only one possible configuration. In other configurations, a downlink resource block could have a greater or fewer number of resource elements available to transmit user data.

The two consecutive slots of time (Slot 0 and Slot 1) are treated as a transmission time interval (TTI) for purposes of LTE's HARQ process. In particular, after a WCD has transmitted its data in a TTI, such as shown in FIG. 2B, the WCD waits to receive a HARQ response from the RAN (in the PHICH channel) to determine whether the data should be re-transmitted or whether the WCD can transmit additional data. If the HARQ response is an ACK, indicating that the data was successfully received, then the WCD can transmit additional data. If the HARQ response is a NACK, indicating that the data was received with one or more errors, then the WCD re-transmits the data. The WCD may also re-transmit the data if the WCD does not receive a HARQ response within a predetermined period of time.

On the other hand, if a WCD has been instructed to use TTI bundling, then the WCD may transmit the same data in multiple, consecutive TTIs before waiting for a HARQ response. The TTI bundle size is the number of consecutive TTIs that the WCD uses. Thus, a TTI bundle size of N means that the WCD transmits the same data N times in N consecutive TTIs (i.e., 2N consecutive slots) before waiting for a HARQ response.

As discussed below, the RAN may determine whether TTI bundling is warranted for a particular WCD. In response to a determination that TTI bundling is warranted, the RAN may select a TTI bundle size, N, where N could be any number greater than or equal to 2, and instruct the particular WCD to use TTI bundling with the selected TTI bundle size.

3. Example Methods

Figure 3:
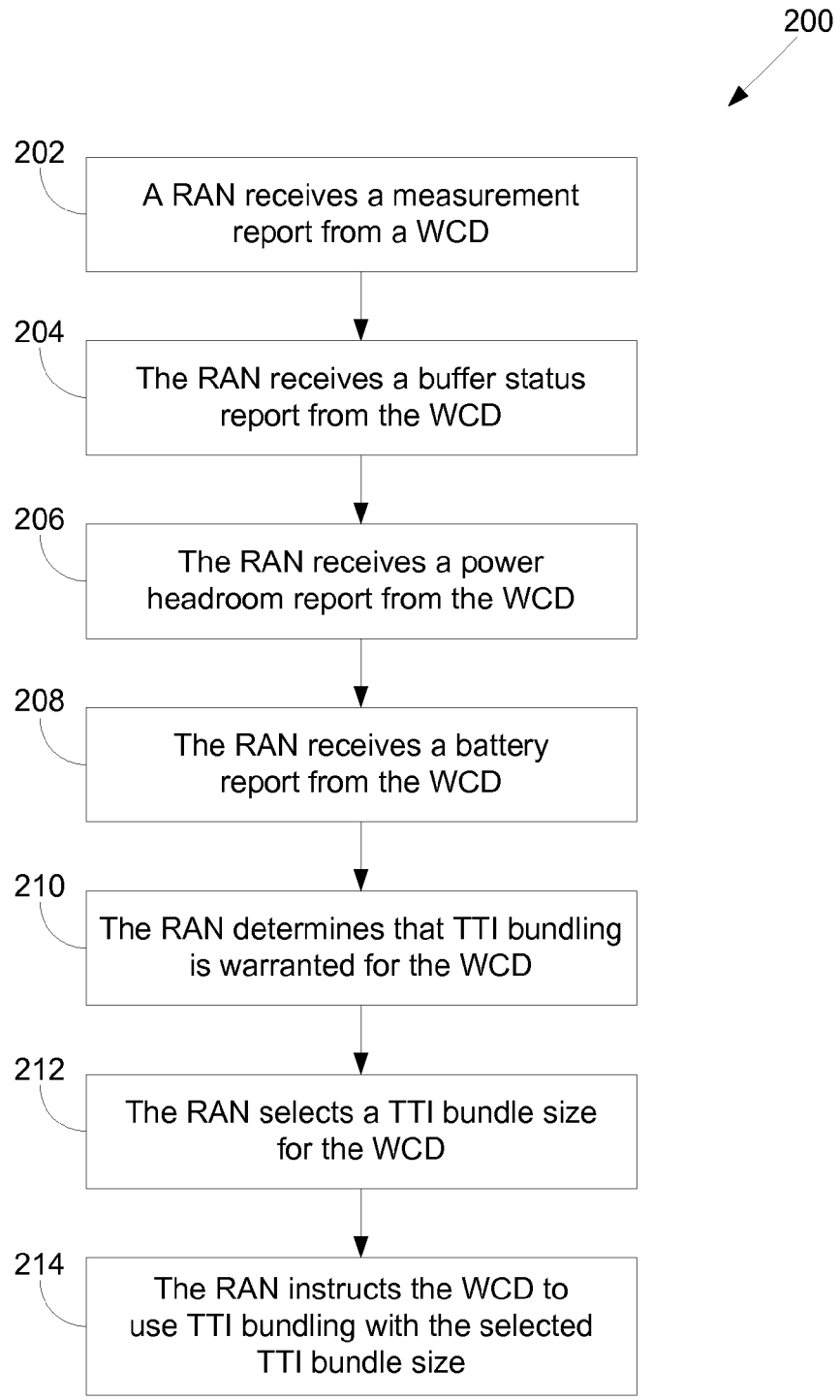
FIG. 3 is a flow chart of a method, in accordance with an example embodiment.
Figure 4:
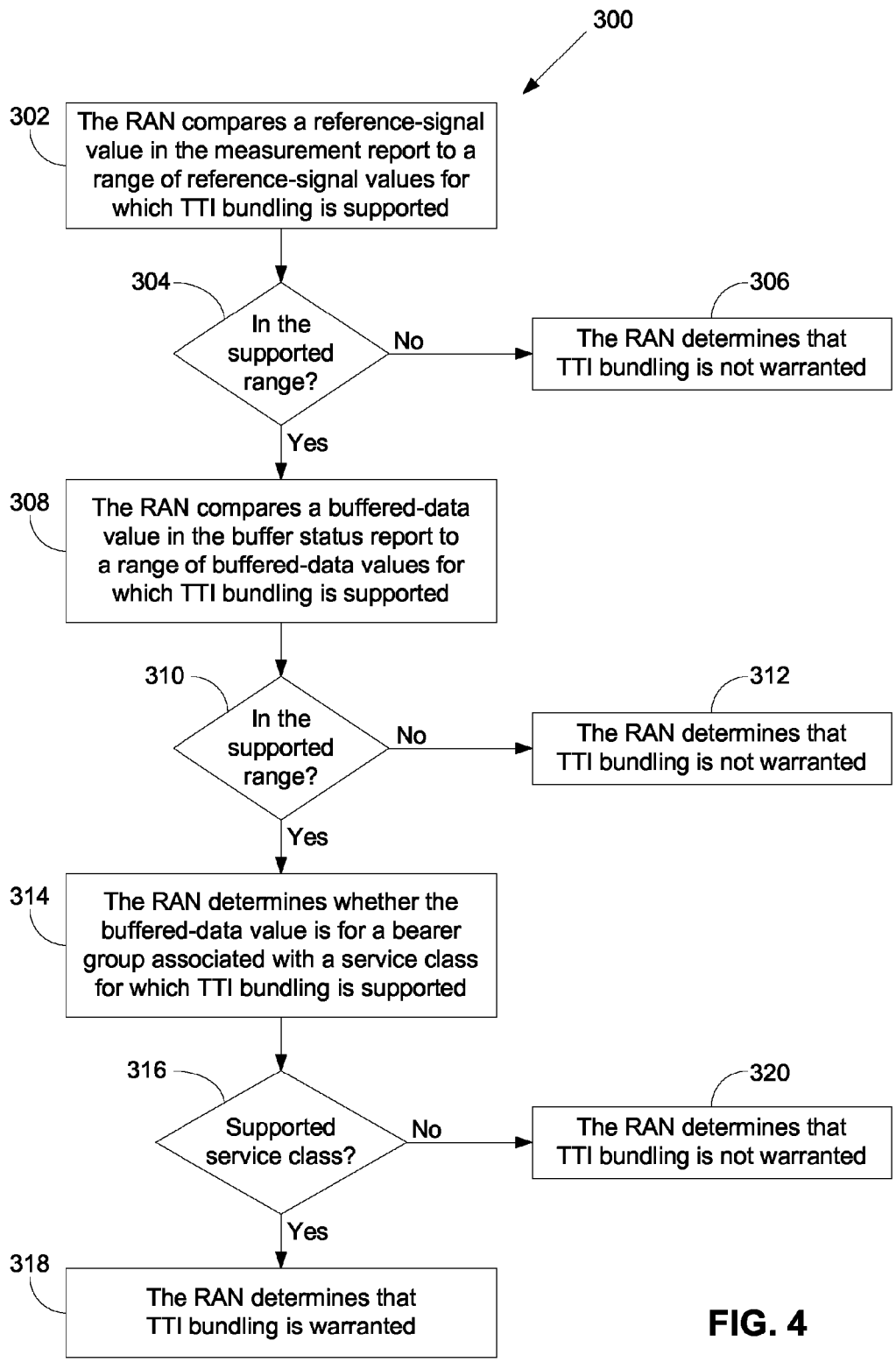
FIG. 4 is a flow chart of a method for determining whether TTI bundling is warranted, in accordance with an example embodiment.
Figure 5:
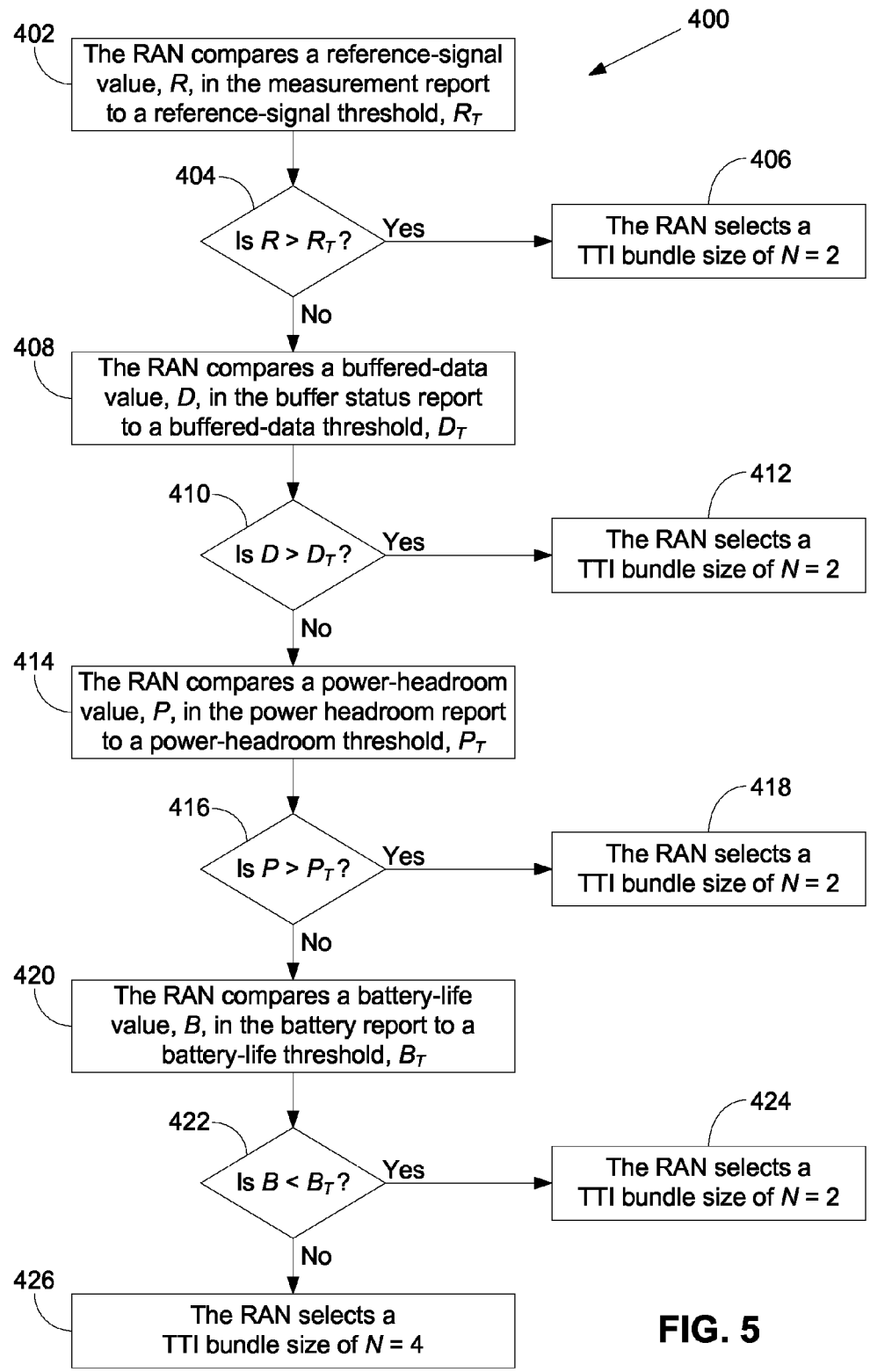
FIG. 5 is a flow chart of a method for selecting a TTI bundle size, in accordance with an example embodiment.

FIGS. 3-5 are flow charts illustrating example methods that may be performed by a RAN. More particularly, FIG. 3 illustrates an overall method, FIG. 4 illustrates a method for determining whether TTI bundling is warranted, and FIG. 5 illustrates for selecting a TTI bundle size. For purposes of illustration, the example methods are described with reference to the configuration of communication system 10 shown in FIG. 1 and the uplink and downlink resource configurations shown in FIGS. 2A, 2B, and 2C. It is to be understood, however, that differently configured communication systems and/or other differently configured uplink and downlink resources could be used.

FIG. 3 is a flowchart illustrating an example method 200 for a RAN, in which the RAN receives reports from a WCD, determines that TTI bundling is warranted for the WCD, selects a TTI bundle size for the WCD, and instructs the WCD to use TTI bundling with the selected TTI bundle size.

At block 202, the RAN (e.g., RAN 12) receives a measurement report from a WCD (e.g., WCD 16). The measurement report includes one or more reference-signal values determined by the WCD. The one or more reference-signal values may include, for example, an RSRP value and/or an RSRQ value.

To determine an RSRP value, the WCD may coherently demodulate cell-specific reference signals transmitted by the RAN (e.g., transmitted by BS 14) in a specified bandwidth and obtain an RSRP measurement by measuring an average received power of the reference signals over a specified period of time. The reference signals may correspond to signals in specific resource elements, such as the resource elements labeled "R" in FIG. 2C. The WCD may map the RSRP measurement to an RSRP value and include the RSRP value in a measurement report. In one example, the RSRP measurement is mapped to an RSRP value ranging from 0 to 97, in which an RSRP measurement below −140 dBm maps to an RSRP value of 0, and an RSRP measurement above −44 dBm maps to an RSRP value of 97. The RSRP value can serve as a signal strength metric for a specific cell in the RAN. In some LTE systems, the RSRP value may be used to rank candidate cells according to their signal strengths for purposes of handover and cell reselection decisions.

To determine an RSRQ value, the WCD may measure RSRP, measure RSSI, and determine an RSRQ measurement as (M×RSRP)/RSSI, where M is the number of resource blocks in the measurement bandwidth used to obtain RSRP and RSSI. The RSRP measurement may be obtained by the WCD coherently demodulating cell-specific reference signals transmitted by the RAN, as described above. The WCD may determine RSSI (Received Signal Strength Indicator) by measuring the total received power from all sources within a specified bandwidth. Thus, the RSRQ measurement can include contributions from the cell serving the WCD, from one or more non-serving cells, from adjacent channel interference, and from thermal noise. By taking into account both signal strength and interference, RSRQ provides a signal quality metric for a specific cell. The WCD may map the RSRQ measurement to an RSRQ value and report the RSRQ value in a measurement report. In one example, the RSRQ measurement is mapped to an RSRQ value ranging from 0 to 34, in which an RSRQ measurement below −19.5 dB being maps to an RSRQ value of 0, and an RSRQ measurement above −3 dB being maps to an RSRQ value of 34. In some LTE systems, the RSRQ value may be used to rank candidate cells according to their signal strengths for purposes of handover and cell reselection decisions.

At block 204, the RAN receives a buffer status report from the WCD. The buffer status report may include a buffered-data value indicative of an amount of data being buffered by the WCD for transmission via one or more bearers in a bearer group, with the bearer group being associated with one or more service classes. In this regard, each bearer that is established for the WCD may be associated with a particular quality of service (QoS) class. LTE defines nine different QoS classes, and each QoS class is identified by a respective QoS Class Identifier (QCI). QCIs 1 through 4 correspond to guaranteed bit rate services, such as conversational voice, conversational video, and real-time gaming. QCIs 5 through 9 correspond to non-guaranteed bit rate service classes, such as IMS signaling, TCP-based communications (e.g., Web browsing, email, chat, FTP, etc.), as well as non-guaranteed bit rate voice and video services. Different bearers with the same or similar service classes may be grouped together in a Logical Channel Group (LCG), which may be identified by an LCG index. For example, one or more bearers associated with guaranteed bit rate services may be placed in one LCG, and one or more bearers associated with non-guaranteed bit rate services may be placed in another LCG. Other examples of grouping bearers together are possible as well.

The buffered-data value that is included in the buffer status report may be an index ranging from 0 to 63 that is based on the size of the WCD's buffer for a particular bearer group. For example, a buffer size of 0 may map to a buffered-data value of 0, and a buffer size over 150 kilobytes may map to a buffered-data value of 63. The buffer status report may associate the buffered-data value with a LCG either explicitly, for example, by including an LCG index, or implicitly, for example, based on the buffered-data value's position in the buffer status report.

At block 206, the RAN receives a power headroom report from the WCD. The power headroom report indicates the difference between the WCD's maximum transmit power and an estimated transmit power requirement for the WCD's uplink resource allocation. The power headroom could be either positive (indicating that the WCD has "headroom" available to increase its transmit power) or negative (indicating that the WCD's maximum transmit power is insufficient to meet the estimated transmit power requirement for the WCD's uplink resource allocation). The WCD may calculate its power headroom, map the calculated power headroom to a power-headroom value, and report the power-headroom value in the WCD's power headroom report. In one example, the power-headroom value ranges from 0 to 63, in which a power headroom less than −22 dB maps to a power-headroom value of 0, and a power headroom above 40 dB maps to a power-headroom value of 63.

At block 208, the RAN receives a battery report from the WCD. The battery report may include a battery-life value indicative of a remaining battery life of a battery in the WCD. The battery-life value could correspond to a percentage of the battery's life that still remains, a remaining battery capacity (e.g., in milliamp-hours), a length of use time remaining for the battery given an assumed power usage, or the battery-life value could correspond to some other metric of the battery's remaining life or capacity.

At block 210, the RAN determines that TTI bundling is warranted for the WCD. The determination could be made based on, at least in part, one or more of the reports received in blocks 202-208. An example method for determining whether TTI bundling is warranted for the WCD is described below with reference to FIG. 4. It is to be understood, however, that other methods could be used.

At block 212, the RAN selects a TTI bundle size for the WCD. The TTI bundle size could be selected based on, at least in part, one or more of the reports received in blocks 202-208. An example method for selecting a TTI bundle size for the WCD is described below with reference to FIG. 5. It is to be understood, however, that other methods could be used.

At block, 214, the RAN instructs the WCD to use TTI bundling with the selected TTI bundle size. For example, the RAN may transmit an instruction to WCD in the PDCCH channel in connection with an assignment of uplink resources to the WCD.

Although method 200 has been described above with respect to certain steps that may be performed by the RAN, it is to be understood that the RAN may perform additional or alternative steps, or portions of the method could be performed in different ways. For example, while FIG. 3 shows a certain order to the reports received by the RAN in blocks 202-208, the RAN may receive the reports in a different order. Moreover, some of the reports could be combined, some of the reports could be omitted (e.g., the RAN may not receive a battery report), or the RAN may receive additional reports. In addition, while FIG. 3 illustrates an example in which the RAN selects a TTI bundle size for the WCD and instructs the WCD to use the selected bundle size, in other examples, the RAN might not select a TTI bundle size. In such examples, the RAN may determine that TTI bundling is warranted and instruct the WCD to use TTI bundling, and the WCD may use a standard or predetermined TTI bundle size.

FIG. 4 illustrates an example method 300 for determining whether TTI bundling is warranted for a particular WCD. In this example, the RAN is assumed to have received a measurement report and buffer status report from the WCD, as described above for FIG. 3. It is to be understood, however, that the determination of whether TTI bundling is warranted could be made based on a greater or fewer number of reports, or the determination could be made based on a different set of reports and/or based on other information.

At block 302, the RAN compares a reference-signal value in the measurement report (e.g., an RSRP value or RSRQ value) to a range of reference-signal values for which TTI bundling is supported. The range of reference-signal values for which TTI bundling is supported could be a predetermined range. For example, in the case that the reference-signal value is an RSRP value that can range between 0 (lowest signal strength) and 97 (highest signal strength), a preset portion of that range (e.g., 0 to 30) could be designated as supportive of TTI bundling. Alternatively, the range of reference-signal values for which TTI bundling is supported could be a variable range that is dependent upon other factors, such as information received in the buffer status report. For example, different amounts of buffered data and/or different service classes for which the WCD is buffering data may be associated with different ranges of reference-signal values for which TTI bundling is supported.

How the RAN proceeds may depend on whether the reference-signal value is within the supported range, as indicated by block 304. If the reference-signal value is not in the supported range, then the RAN may determine that TTI bundling is not warranted for the WCD, as indicated by block 306. If the reference-signal value is in the supported range, then the RAN may evaluate the information contained in the buffer status report. For example, the RAN may compare a buffered-data value in the buffer status report to a range of buffered-data values for which TTI bundling is supported, as indicated by block 308.

The range of buffered-data values for which TTI bundling is supported could be a predetermined range. For example, in the case that the buffered-data value is a value that can range between 0 (smallest buffered data amount) and 63 (largest buffered data amount), a preset portion of that range (e.g., 0 to 30) could be designated as supportive of TTI bundling. Thus, in some examples, TTI bundling may be supported when the WCD has a relatively small amount of data to transmit but may not be supported when the WCD has a relatively large amount of data to transmit. Alternatively, the range of buffered-data values for which TTI bundling is supported could be a variable range that is dependent upon other factors. For example, the range of buffered-data values for which TTI bundling is supported may depend on the service class for which the data is being buffered. Other examples are possible as well.

How the RAN proceeds may depend on whether the buffered-data value is in the supported range, as indicated by block 310. If the buffered-data value is not in the supported range, then the RAN may determine that TTI bundling is not warranted for the WCD, as indicated by block 312. If the buffered-data value is in the supported range, then the RAN may determine whether the buffered-data value is for a bearer group associated with a service class for which TTI bundling is supported, as indicated by block 314.

To make this determination, the RAN may identify the bearer group to which the buffered-data value relates and then determine which service class or classes are associated with the identified bearer group. As discussed above for block 204 in FIG. 3, the bearer group could be identified explicitly in the buffer status report, for example, by an LCG index. Alternatively, the bearer group for the buffered-data value could be identified implicitly, for example, based on where the buffered-data value appears in the buffer status report. For example, the buffer status report may include multiple buffered-data values, in which case, the RAN may conclude that the first buffered-data value is associated with LCG 0, the second buffered-data value is associated with LCG 1, etc. The RAN may evaluate each of the buffered-data values as described above, and then evaluate each respective bearer group for the one or more buffered-data values that are found to be in the supported range.

Once the RAN has identified the bearer group for the buffered-data value, the RAN may determine which service class or classes are associated with the identified bearer group. To make this determination, the RAN may look up a table that associates bearer groups (the bearer groups could be given as LCG indices) with service classes (the service classes could be indicated by QCIs). The table could be specific to a particular WCD, or the table could apply to all WCDs being served by a particular base station or to a particular class or group of WCDs. Other ways of determining the service class or service classes associated with the identified bearer group are possible as well.

Once the RAN has identified the one or more service classes that relate to the buffered-data value, the RAN may compare the one or more service classes to a list of service classes for which TTI bundling is supported. In particular, TTI bundling might be supported for some certain services classes but not for others. In some examples, TTI bundling may be supported for guaranteed bit rate services (corresponding to QCIs 1 through 4) but not for non-guaranteed bit rate services (QCIs 5 through 9). In other examples, TTI bundling may be supported for a narrower range of certain service classes, for example, certain service classes that are particularly latency-sensitive, such as conversational voice (QCI 1) or conversational video (QCI 2). In still other examples, TTI bundling may be supported for a wider range of service classes (TTI bundling could even be supported for all service classes). It also possible that a service class could be supportive of TTI bundling, but only under certain conditions such as particular ranges of reference-signal values and/ or buffered-data values. Thus, the list of service classes for which TTI bundling is supported could be a preset list, or the list could be dependent on other factors. Other examples are possible as well.

How the RAN proceeds may depend on whether the one or more service classes associated with the buffered-data value's bearer group include a service class for which TTI bundling is supported, as indicated by block 316. If the one or more service classes include a service class for which TTI bundling is supported, then the RAN may determine that TTI bundling is warranted for the WCD, as indicated by block 318. If the one or more service classes do not include a service class for which TTI bundling is supported, then the RAN may determine that TTI bundling is not warranted for the WCD, as indicated by block 320.

In some cases, the RAN may determine that the buffered-data value is for a bearer group that is associated with multiple service classes and that the multiple service classes include a service class for which TTI bundling is supported and a service class for which TTI bundling is not supported. In that situation, the RAN may conclude that at least some of the buffered data indicated by the buffered-data value is for a bearer that is associated with the supported service class and, as a result, determine that TTI bundling is warranted. Alternatively, the RAN may refer to other information to determine whether the WCD is actively transmitting via the bearer that is associated with the supported service class, rather than the bearer that is associated with a service class for which TTI bundling is not supported, before determining that TTI bundling is warranted.

It is to be understood that method 300 shown in FIG. 4 is merely one example of how a RAN may determine whether TTI bundling is warranted for a WCD. In other examples, the RAN could evaluate reports in a different order (e.g., the RAN might evaluate the buffer status report before the measurement report). In still other examples, the RAN could evaluate one or more reports instead of, or in addition to, the measurement report and buffer status report described above. For example, the RAN may receive a battery report from the WCD and determine whether a battery-life value included in the battery report is in a range of battery-life values for which TTI bundling is supported. In such examples, the RAN may determine that TTI bundling is warranted if the battery-life value is sufficiently high, indicating that the WCD has sufficient battery life to transmit multiple instances of data for TTI bundling. If the battery-life value is low, then the RAN may determine that TTI bundling is not warranted.

FIG. 5 illustrates an example method 400 for selecting a TTI bundle size for a particular WCD. In this example, the RAN selects a TTI bundle size from among a standard TTI bundle size (N=4) and a smaller TTI bundle size (N=2). It is to be understood, however, that the RAN could select the TTI bundle size from among a larger number of values and/or the RAN could select the TTI bundle size from among different values (e.g., N=3, N=8, N=16, etc.). Further, this example assumes that the RAN has received a measurement report, buffer status report, power headroom report, and battery report from the WCD. In other examples, however, the RAN may select the TTI bundle size based on a greater or fewer number of reports and/or based on other information.

At block 402, the RAN compares a reference-signal value, R, in the measurement report to a reference-signal threshold, $R_T$. The value of $R_T$ may be selected based on the concept that a larger TTI bundle size may be justified when RF conditions are relatively bad (e.g., as indicated by a relatively low reference-signal value), whereas a smaller TTI bundle size may be sufficient when RF conditions are relatively good (e.g., as indicated by a relatively high reference-signal value). Thus, how the RAN proceeds may depend on whether R is greater than $R_T$, as indicated by block 404. If R is greater than $R_T$, then the RAN may select the smaller TTI bundle size (N=2), as indicated by block 406. If not, then the RAN may consider the information contained in the buffer status report.

For example, the RAN may compare a buffered-data value, D, in the buffer status report to a buffered-data threshold, $D_T$, as indicated by block 408. The value of $D_T$ may be selected based on the concept that a smaller TTI bundle size may be more efficient (e.g., more preserving of battery life) when the WCD has a relatively large amount of data to transmit. Thus, how the RAN proceeds may depend on whether D is greater than $D_T$, as indicated by block 410. If D is greater than $D_T$, then the RAN may select the smaller TTI bundle size (N=2), as indicated by block 412. If not, then the RAN may consider the information contained in the power headroom report.

For example, the RAN may compare a power-headroom value, P, in the power headroom report to a power-headroom threshold, $P_T$, as indicated by block 414. The value of $P_T$ may be selected based on the concept that if the WCD has a sufficiently positive power headroom, then the WCD may be able increase its transmit power to improve reception, such that a smaller TTI bundle size may be sufficient. Thus, how the RAN proceeds may depend on whether P is greater than $P_T$, as indicated by block 416. If P is greater than $P_T$, then the RAN may select the smaller TTI bundle size (N=2), as indicated by block 418. If not, then the RAN may consider the information contained in the battery report.

For example, the RAN may compare a battery-life value, B, in the battery report to a battery-life threshold, $B_T$, as indicated by block 420. The value of $B_T$ may be selected based on the concept that if the WCD's remaining battery life is relatively low, then a smaller TTI bundle size may be beneficial to preserve battery life. Thus, how the RAN proceeds may depend on whether B is less than $B_T$, as indicated by block 422. If D is less than $D_T$, then the RAN may select the smaller TTI bundle size (N=2), as indicated by block 424. If not, then the RAN may select the standard TTI bundle size (N=4), as indicated by block 426.

In method 400 shown in FIG. 5, the RAN treats the standard TTI bundle size (N=4) as a default value that is selected unless the measurement report, buffer status report, power headroom report, or battery life report contains information that indicates that the smaller TTI bundle size (N=2) is sufficient or desirable. As such, the RAN may consider the information contained in these reports in a different order than what is shown in FIG. 5 and described above. The RAN may also consider whether any of the information contained in the reports indicates that a larger TTI bundle size (e.g., a TTI bundle size of N=8) may be beneficial. For example, in addition to the power-headroom threshold, $P_T$, described above, a lower power-headroom threshold, $P_L$, may be defined, such that the RAN selects the larger TTI bundle size if P is less than $P_L$. Other methods for selecting a TTI bundle size from among a plurality of values, such as from among a standard TTI bundle size, one or more smaller TTI bundle sizes, and/or one or more larger TTI bundle sizes, could be used as well.

4. Example Base Station

Figure 6:
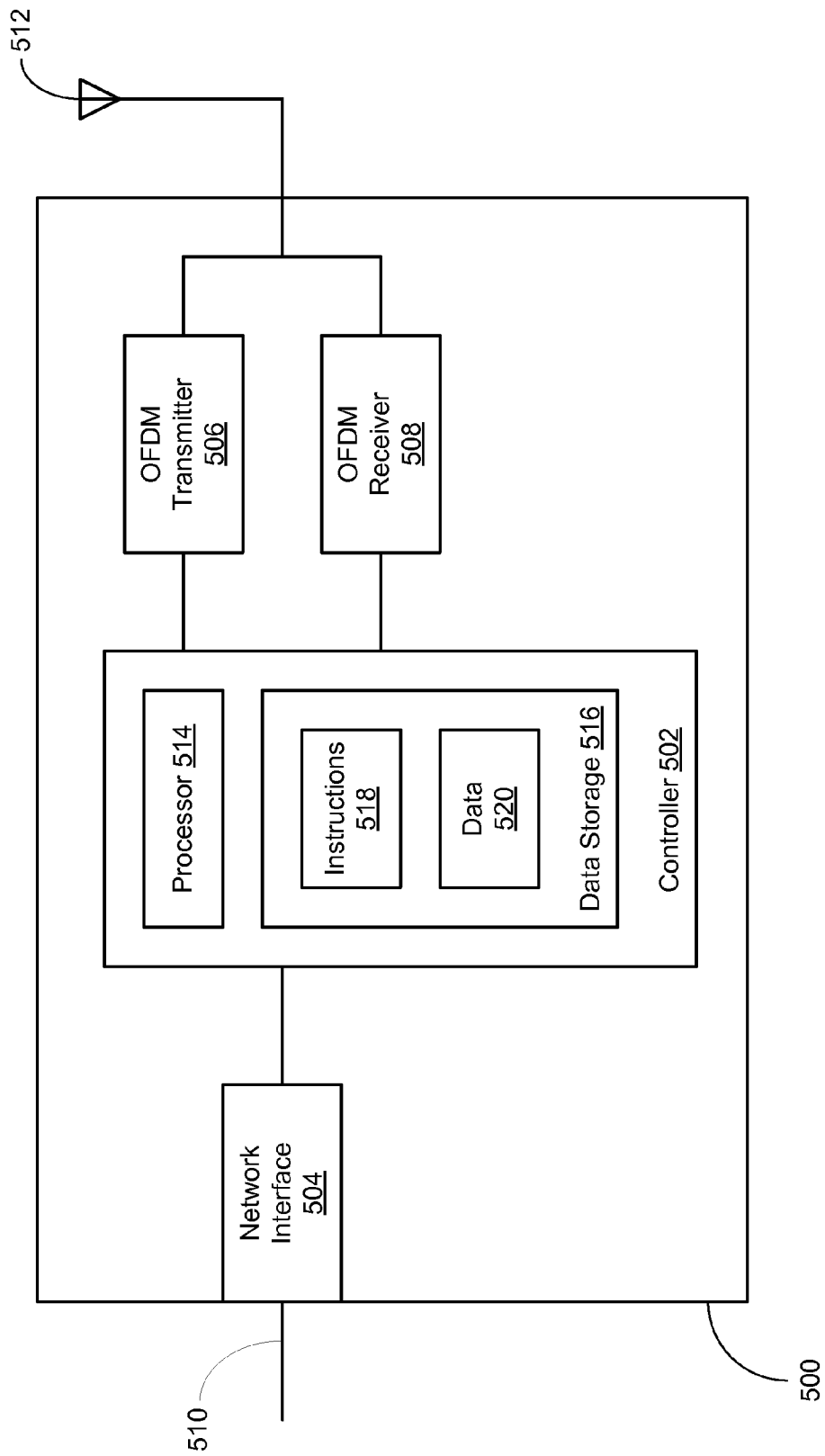
FIG. 6 is a block diagram of a base station, in accordance with an example embodiment.

FIG. 6 illustrates an example base station 500 that can perform at some of the RAN functions that are described herein, such as functions relating to method 200 shown in FIG. 3, method 300 shown in FIG. 4, and/or method 400 shown in FIG. 5. For example, base station 500 could correspond to base station 14 in RAN 12.

As shown in FIG. 6, base station 500 includes a controller 502 that is coupled to a network interface 504, an OFDM transmitter 506, and an OFDM receiver 508. Network interface 504 is configured to communicate with one or more entities in the RAN via a backhaul connection 510. OFDM transmitter 506 and OFDM receiver 508 are configured to wirelessly communicate with WCDs that are operating in the wireless coverage area of base station 500, via one or more antennas, as exemplified in FIG. 6 by antenna 512. More particularly, OFDM transmitter 506 is configured to transmit OFDM signals in a plurality of downlink channels, which may include a downlink shared channel (e.g., a PDSCH channel) and a downlink control channel (e.g., a PDCCH channel). OFDM receiver 508 is configured to receive OFDM signals in a plurality of uplink channels, including an uplink shared channel (e.g., a PUSCH channel).

Controller 502 could be configured to control the functioning of base station 500. Thus, in relation to TTI bundling, the controller could be configured to: (a) determine whether TTI bundling is warranted for a WCD operating in the wireless coverage area of base station 500, based on at least a measurement report (e.g., a report that includes a reference-signal value determined by a process comprising the WCD coherently demodulating reference signals transmitted by OFDM transmitter 506) and a buffer status report (e.g., a report that includes a buffered-data value indicative of an amount of data being buffered by the WCD for transmission via one or more bearers in a bearer group associated with one or more service classes) transmitted by the WCD and received via OFDM receiver 508; and (b) in response to a determination that TTI bundling is warranted for the WCD, cause OFDM transmitter 506 to transmit an instruction to WCD in the downlink control channel, wherein the instruction instructs the WCD to use TTI bundling when transmitting data in the uplink shared channel. The controller may further be configured to select a TTI bundle size for the WCD when TTI bundling is warranted and to cause the selected TTI bundle size to be included in the instruction transmitted by OFDM 506. In general, controller 502 may be configured to perform any of the functions described herein.

Controller 502 could be implemented using hardware, software, and/or firmware. In an example embodiment, controller 502 includes a processor 514 and data storage 516. Data storage 516 may include any type of non-transitory computer readable medium, such as random access memory (RAM), read-only memory (ROM), flash memory, cache memory, one or more magnetically encoded disks, one or more optically encoded disks, and/or any other type of volatile or non-volatile memory. Data storage 516 may store instructions 518 and data 520. Instructions 518 could be executable instructions that, when executed by processor 514, cause base station 500 to perform functions, such as any of the RAN functions described herein. Data 520 may include, for example, data from measurement reports, buffer status reports, power headroom reports, and/or battery life reports, as well as any other type of data that may be generated or used by controller 502.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
    receiving, by a radio access network (RAN), a measurement report from a wireless communication device (WCD), wherein the measurement report includes a reference-signal value determined by a process comprising the WCD coherently demodulating reference signals transmitted by the RAN;
    receiving, by the RAN, a buffer status report from the WCD, wherein the buffer status report includes a buffered-data value indicative of an amount of data being buffered by the WCD for transmission via one or more bearers in a bearer group, the bearer group being associated with one or more service classes;
    making a determination, by the RAN, that transmission time interval (TTI) bundling is warranted for the WCD, wherein making the determination comprises:
        determining, by the RAN, that the reference-signal value is in a range of reference-signal values for which TTI bundling is supported;
        determining, by the RAN, that the bearer group is associated with a service class for which TTI bundling is supported; and
        determining, by the RAN, that the buffered-data value in the buffer status report for the bearer group is in a range of buffered-data values for which TTI bundling is supported; and
    transmitting, by the RAN, an instruction to the WCD to use TTI bundling.

2. The method of claim 1, wherein the reference signals are included in orthogonal frequency division multiplexing (OFDM) symbols.

3. The method of claim 2, wherein the reference-signal value is indicative of a reference signal received power.

4. The method of claim 2, wherein the reference-signal value is indicative of a reference signal received quality.

5. The method of claim 1, further comprising:
    receiving, by the RAN, a battery report from the WCD, wherein the battery report includes a battery-life value indicative of a remaining battery life of a battery in the WCD.

6. The method of claim 5, wherein making the determination further comprises:
    determining, by the RAN, that the battery-life value is in a range of battery-life values for which TTI bundling is supported.

7. The method of claim 1, further comprising:
    selecting, by the RAN, a TTI bundle size for the WCD; and
    transmitting, by the RAN, an instruction to the WCD to use the selected TTI bundle size.

8. The method of claim 7, further comprising:
    receiving, by the RAN, a power headroom report from the WCD, wherein the power headroom report includes a power-headroom value indicative of a difference between a maximum transmit power of the WCD and a transmit power requirement of the WCD; and
    receiving, by the RAN, a battery report from the WCD, wherein the battery report includes a battery-life value indicative of a remaining battery life of a battery in the WCD.

9. The method of claim 1, wherein selecting, by the RAN, a TTI bundle size for the WCD comprises selecting the TTI bundle size from among at least a first value and a second value based on at least the measurement report, buffer status report, power headroom report, and battery report.

10. A system, comprising:
    a transmitter for transmitting orthogonal frequency division multiplexing (OFDM) signals in a plurality of downlink channels, the plurality of downlink channels including a downlink shared channel and a downlink control channel;
    a receiver for receiving OFDM signals in a plurality of uplink channels, the plurality of uplink channels including an uplink shared channel; and
    a controller, wherein the controller is configured to perform operations comprising:
        making a determination whether transmission time interval (TTI) bundling is warranted for a wireless communication device (WCD), wherein the determination is based on at least both a measurement report and buffer status report transmitted by the WCD, wherein the measurement report includes a reference-signal value determined by a process comprising the WCD coherently demodulating reference signals transmitted by the transmitter, and wherein the buffer status report includes a buffered-data value indicative of an amount of data being buffered by the WCD for transmission via one or more bearers in a bearer group, the bearer group being associated with one or more service classes, wherein making the determination comprises:
  determining whether the reference-signal value is in a range of reference-signal values for which TTI bundling is supported;
  determining whether the bearer group is associated with a service class for which TTI bundling is supported; and
  determining whether the buffered-data value in the buffer status report for the bearer group is in a range of buffered-data values for which TTI bundling is supported; and
in response to a determination that TTI bundling is warranted for the WCD, causing the transmitter to transmit an instruction to the WCD in the downlink control channel, wherein the instruction instructs the WCD to use TTI bundling when transmitting data in the uplink shared channel.

11. The system of claim 10, wherein the reference-signal value is indicative of a reference signal received power or a reference signal received quality.

12. The system of claim 10, wherein the operations further comprise selecting a TTI bundle size for the WCD when TTI bundling is warranted, wherein the instruction to the WCD includes the selected TTI bundle size.

13. The system of claim 10, wherein the determination is further based on a battery report transmitted by the WCD, wherein the battery report includes a battery-life value indicative of a remaining battery life of a battery in the WCD.

14. The system of claim 13, wherein making the determination further comprises:
  determining whether the battery-life value is in a range of battery-life values for which TTI bundling is supported.

* * * * *